United States Patent [19]

Cavil et al.

[11] 4,413,215

[45] Nov. 1, 1983

[54] MARINE TRIM AND TILT POSITIONING SYSTEM

[75] Inventors: David T. Cavil, Menomonee Falls; William R. Krueger, West Allis, both of Wis.

[73] Assignee: Outboard Marine Corporation, Waukegan, Ill.

[21] Appl. No.: 268,723

[22] Filed: Jun. 1, 1981

[51] Int. Cl.³ .............................................. G05D 1/00
[52] U.S. Cl. ................................ 318/588; 318/297; 318/603; 114/144 RE
[58] Field of Search ............... 318/297, 663, 588, 589; 114/144 RE; 440/61

[56] References Cited

U.S. PATENT DOCUMENTS

| | | | |
|---|---|---|---|
| 3,641,965 | 2/1972 | Schmiedel | 115/41 |
| 3,662,243 | 5/1972 | Cavil et al. | 114/144 RE UX |
| 3,739,738 | 6/1973 | Cavil | 114/144 R |
| 3,797,449 | 3/1975 | Carpenter et al. | 115/41 HT |
| 3,894,250 | 2/1975 | Hager et al. | 307/309 |
| 3,995,205 | 11/1976 | Klees | 318/589 |
| 4,342,274 | 8/1982 | Spargin et al. | 318/588 X |

*Primary Examiner*—B. Dobeck
*Attorney, Agent, or Firm*—Michael, Best & Friedrich

[57] ABSTRACT

A reversible motor is coupled to the stern leg of a watercraft for angulating the leg up and down through a trim and tilt range. A manually settable device provides a voltage signal corresponding to the desired trim angle and a position sensor provides a voltage signal corresponding to the present stern leg position. A first comparator changes the state of its output if the difference between the signals has one polarity and a second comparator changes state for the opposite polarity. The state changes turn on one of two transistor switches which provide an up or a down signal, respectively, to a motor control circuit for causing the motor to run until the difference is nulled. When the active transistor switch turns off, the other delivers a momentary pulse for plugging the motor. The switching transistors are supplied from a power source through up and down tilt control push button switches which, when operated, remove power from the transistor switches and the entire trim control circuit and disable the trim function. The position signal and another reference signal, corresponding to the upper trim limit, are fed to a third comparator such that if the stern leg is tilted out of the permissible trim range any state changes of the first and second comparators are nullified to thereby disable the trim function. Other comparators nullify the trim function in response to an electric circuit failure. The trim control remembers where it was set and restores the stern leg to the trim angle existing at the time the tilt function overrode the trim function by disabling the latter.

8 Claims, 2 Drawing Figures

MARINE TRIM AND TILT POSITIONING SYSTEM

BACKGROUND OF THE INVENTION

This invention pertains to controlling and indicating the tilt and trim of the propeller carrying stern leg of a marine propulsion unit.

A typical stern leg with which the new control system may be used is one that is mounted on the transom of a boat for being driven about a vertical axis to steer the boat and about a horizontal axis to alter the attitude or angle of the propeller axis and thereby affect a change in th pitch or trim of the boat. Turning the stern leg about the horizontal axis through a large angle such as is sufficient to lift the propeller out of the water to clear an obstruction or for docking is characterized by the term "tilt." Turning the stern leg about the horizontal axis through a limited angle with the propeller remaining totally under water to set the attitude or level of the boat itself while it is underway is characterized as "trim." Customarily, manually operated control devices for selecting and determining tilt and trim are located within reach of the boat operator.

Hydraulic work cylinders are commonly interposed between the transom of the boat and the stern leg for turning the stern leg through the trim angle range, which may be between 0° and about 25° from vertical, and through the larger full lift or tilt angle range which may go up to about 45° to 55° from vertical. The hydraulic work cylinder also holds the stern leg at the selected angle. Hydraulic pressure for bidirectional operation of the hydraulic work cylinders can be obtained from a reversible pump driven by a reversible motor.

There are a variety of prior art systems for regulating trim angle. One system is described in U.S. Pat. No. 3,894,250. In this system, the operator sets a potentiometer at the operator control station to the desired trim angle as indicated by a calibrated scale. Another signal, indicative of the present angle of the stern leg, is derived from a sensor which turns with the stern leg. Whether the stern leg angle is greater or less than the manually set angle is determined by using operational amplifier comparators. If the trim angle called for by the manually set potentiometer is greater than the present angle of the stern leg sensor, an error signal of such polarity is produced as to cause a motor driving a hydraulic pump to turn in an appropriate direction for applying pressure to the proper side of the work cylinder piston to drive the stern leg until it agrees with the selected manual setting. If the stern leg is at a lesser angle than that which has been manually set, an error signal is produced having such polarity as to cause the pump motor to turn in the opposite direction and drive the stern leg until null is reached or the manually selected angle and the actual stern leg angle agree. Insofar as can be determined from the disclosure in the cited patent, the same manually settable control device would be used for causing the stern leg to be turned through one angular range for trim and a larger angular range for tilt. The alternative would be to have separate control circuits for tilt and trim functions. One cannot infer that there is anything present for inactivating the trim function if the stern leg is in its tilt angle range nor is it evident that using the tilt control would override the trim function. In other words, the tilt and trim functions are not mutually exclusive.

Another trim or tilt angle control system is disclosed in U.S. Pat. No. 3,797,449. It uses a bridge circuit which puts out an error signal until the difference between the manually selected tilt or trim angle and the present angle of the stern leg agree. One leg of the bridge circuit is constituted by an electromagnet coil that drives a meter for producing an indication of the stern angle at which null occurred. Tilting the stern leg with a hydraulic work cylinder is suggested in this patent. The work cylinder is pressurized with a hydraulic pump driven by a reversible motor. One push button switch is provided to the operator for raising the stern leg and another for lowering it. The push buttons, through appropriate circuitry, control the rotational direction of the reversible pump driving motor. The same control devices, namely, the push buttons are used for adjusting trim and tilt of the stern leg. If the operator maintains the stern raising or tilt up switch, the stern leg will be caused by swing through the maximum desired trim angle range and into the tilt range. The tilt and trim functions are not mutally exclusive.

Another prior system is shown in U.S. Pat. No. 3,641,965. In this case, three push buttons are provided, one for raising the stern leg during trimming, another for lowering it, and another that is used in combination with the first one to override a limit switch and let the stern leg angulate into the tilt angle range. The tilt and trim functions are, therefore, not mutually exclusive.

U.S. Pat. Nos. 3,662,243 and 3,739,738 illustrate marine propulsion device steering control circuits that compare a signal corresponding to the angle to which a steering wheel has been turned with a signal corresponding to the position of the steering unit. When a difference signal exists transistors are turned on and they control relays which cause the steering unit drive motor to run until the difference is nulled.

SUMMARY OF THE INVENTION

An object of the invention is to provide trim control having an operational range limited to the trim range such that the operator cannot tilt the stern leg using the trim control nor trim the stern leg using the tilt control.

Another object of the invention is to provide for disabling the trim control if the stern leg angle exceeds a predetermined upper limit, this feature being implemented by using a potentiometer which senses the upper limit and provides an unbalance condition which results in disabling the control.

An important feature of the invention is to provide a control circuit wherein the previously set trim position is memorized such that when the manual tilt control switches are released, the stern leg will return to the trim angle to which it was set before the tilt function was used unless the stern leg has been moved above a predetermined level in which case it must be restored to within the trim angle range by continued use of the tilt controls.

Another object of the invention is to provide for automatic deactivation of the trim function in the event a failure occurs in the control circuitry which might cause the stern leg to be driven to an angle which would create a dangerous condition if the boat were underway at high speed.

In accordance with the invention the stern leg of a water craft is drivable through trim angle and tilt angle ranges under the influence of a reversible electric motor. A motor control circuit responds to first and second input signals by causing said motor to run in one direction and an opposite direction respectively. A trim angle control circuit is provided with a manually selected reference voltage signal corresponding to the desired trim angle and a voltage signal corresponding to the present position of the stern leg. Two comparators are used. One changes the state of its output when the reference signal is greater than the position signal and the other changes state when the reference signal is less than the position signal. A state change on one comparator output causes a first switch to input a signal to the motor control circuit for causing the motor to run in a direction for increasing the trim angle and a state change on the other comparator output causes the motor to run oppositely from decreasing the trim angle. In either case the motor runs until the difference between the reference and position signals is nulled. The trim control circuit is normally supplied from a power source through first and second tilt control switches. When either tilt control switch is actuated, power to the trim control circuit is removed from it and it becomes disabled. The actuated switch then causes one or another corresponding control signal to be input to the motor control circuit for causing the motor to run in the proper direction for raising or lowering the stern leg.

Further, in accordance with the invention, the trim control circuit remembers where it has set the trim before the tilt function was used. When the stern leg is tilted back down to within the trim range and the tilt switch is inactivated, the stern leg is automatically trimmed to its previous position before it was tilted.

Further, in accordance with the invention, a potentiometer is used to provide a signal which corresponds to the upper permissible trim limit. This signal is compared with the position signal by means of another comparator. If the magnitude of the position signal is greater than this reference voltage, the comparator changes state and prevents both of the other comparators from producing motor control signals so as to effectively disable the trim function if the stern leg has been tilted out of the trim range.

Further, in accordance with the invention, means are provided to apply a reversing signal to the motor after it has been deenergized by reason of reference and position signal null having occurred to thereby prohibit coasting of the motor.

Another feature of the invention is to have a feedback circuit between the input and output of the first mentioned two comparators for producing hysteresis, that is, for making the upper trip level of the comparators different than the lower trip levels so the motor does not hunt if it overtravels slightly or if the stern leg angle is changed by a trivial amount due to a minor impact.

Means are also provided to disable the trim function if a conductor opens.

DESCRIPTION OF A PREFERRED EMBODIMENT

Figure 1:
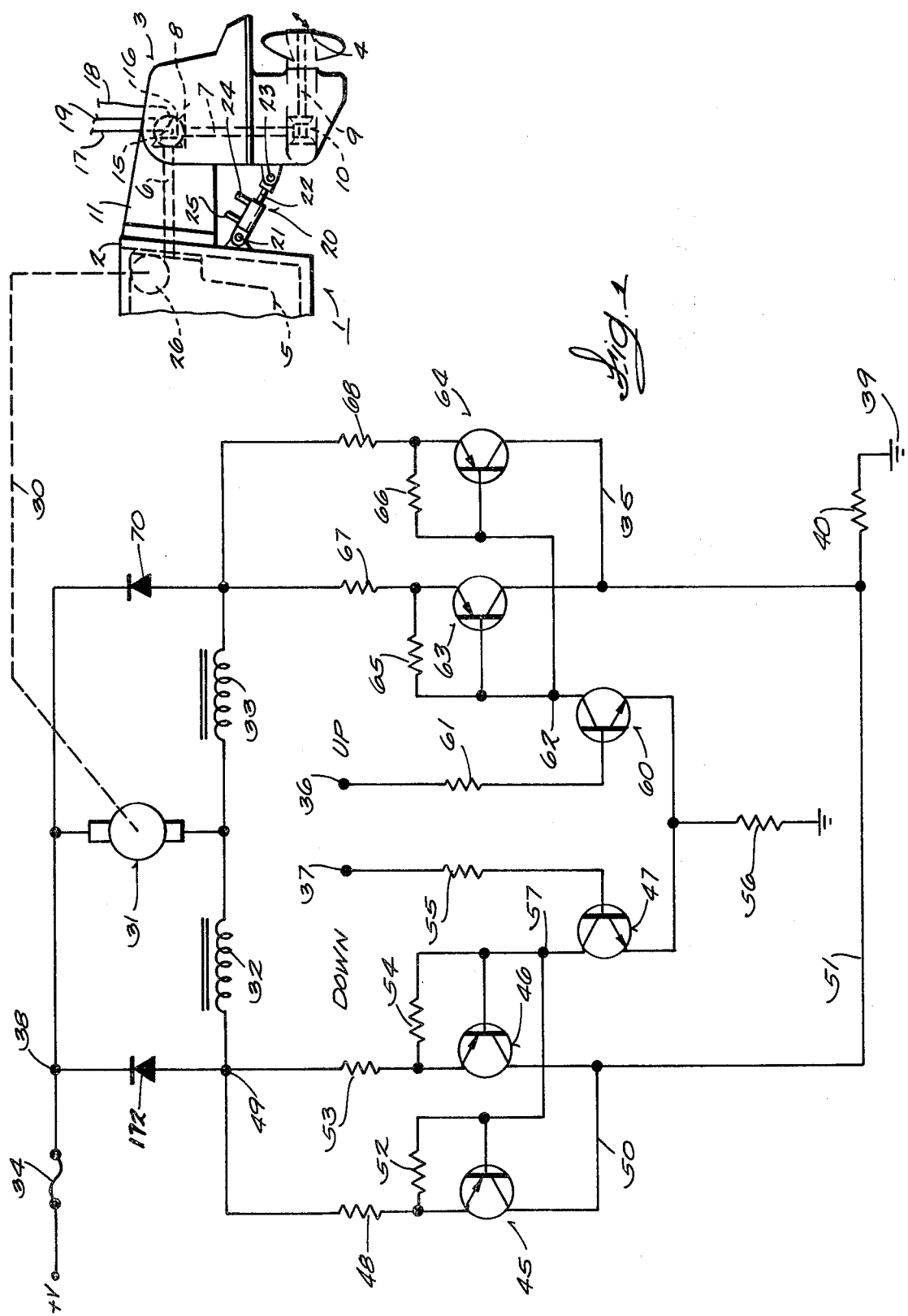
FIG. 1 depicts a fragment of the stern of a boat on which a propulsion unit or stern leg is mounted, this figure also showing a circuit for establishing the rotational direction of a reversible motor which drives a hydraulic pump for actuating a hydraulic actuator that is used for tilting and trimming the stern leg.

FIG. 1 shows a fragment of the stern 1 of a boat which includes the customary transom 2. The stern leg or propulsion and steering unit 3 carries a propeller 4. The engine transmission within the boat is represented by the dashed lines marked 5. The propeller is driven by a horizontal shaft 6 extending from the transmission and vertical shaft 7, which shafts are coupled by beveled gear train 8. The propeller shaft 9 is coupled to vertical shaft 7 with beveled gear train 10. Stern leg 3 is turnable on a bracket 11 about a vertical axis coinciding with the axis of vertical shaft 10 to steer the boat. The stern leg 3 is also mounted for angulating about a horizontal axis that is perpendicular to the plane of the drawing and is indicated by reference numeral 15. The stern leg 3 angulates about axis 15 in a vertical plane and through a predetermined and limited angular range for trimming and beyond that range to another angular limit which determines the tilt range. A rotary potentiometer is mounted in the stern leg for rotation coincident with the axis 15 about which the stern leg turns in connection with trimming or tilting. The potentiometer is indicated by the dashed line circle 16 and its three leads are indicated by the dashed lines marked 17, 18 and 19. Potentiometer 16 is used to provide signals indicative of the angle at which the stern leg resides at any given time as will be more fully discussed later. Potentiometer 16 is also shown at the right side of FIG. 2 actually connected into the trim control unit whose construction is illustrated in that figure.

Referring further to FIG. 1, tilting of stern leg 3 is effected with a hydraulic actuator that is generally designated by the numeral 20. The actuator comprises a work cylinder having a pivot connection 21 between it and transom 2 of the boat. The ram or rod 22 extending from the piston within the cylinder has a pivot connection 23 with the stern leg 3. It will be understood that there is a hydraulic actuator corresponding to the one marked 20 on the opposite side of the stern leg 3 for balancing the driving forces. As is self-evident, applying pressure to one side of the piston in the work cylinder and relief of pressure on the other side causes the ram rod 22 to extend and rotate the stern leg counterclockwise while application of pressure to the other side of the piston and relief of pressure on the one side causes opposite rotation of the stern leg. Fragments of the hoses leading to the work cylinder are marked 24 and 25. These hoses lead to a pump 26 which is symbolized by a dashed line circle located on the inside of transom 2 for the sake of illustration. This hydraulic pump is understood to be reversible and coupled to the hydraulic work cylinder 20 by means of hoses 24 and 25 such as to bring about extension and contraction of ram 22.

A dashed line 30 in FIG. 1 indicates that hydraulic pump 26 is mechanically connected to and driven by a reversible motor 31. In reality, motor 31 is mounted directly to the body of pump 26. Unitary pump 26 and motor 31 assemblies are commercially available.

Figure 2:
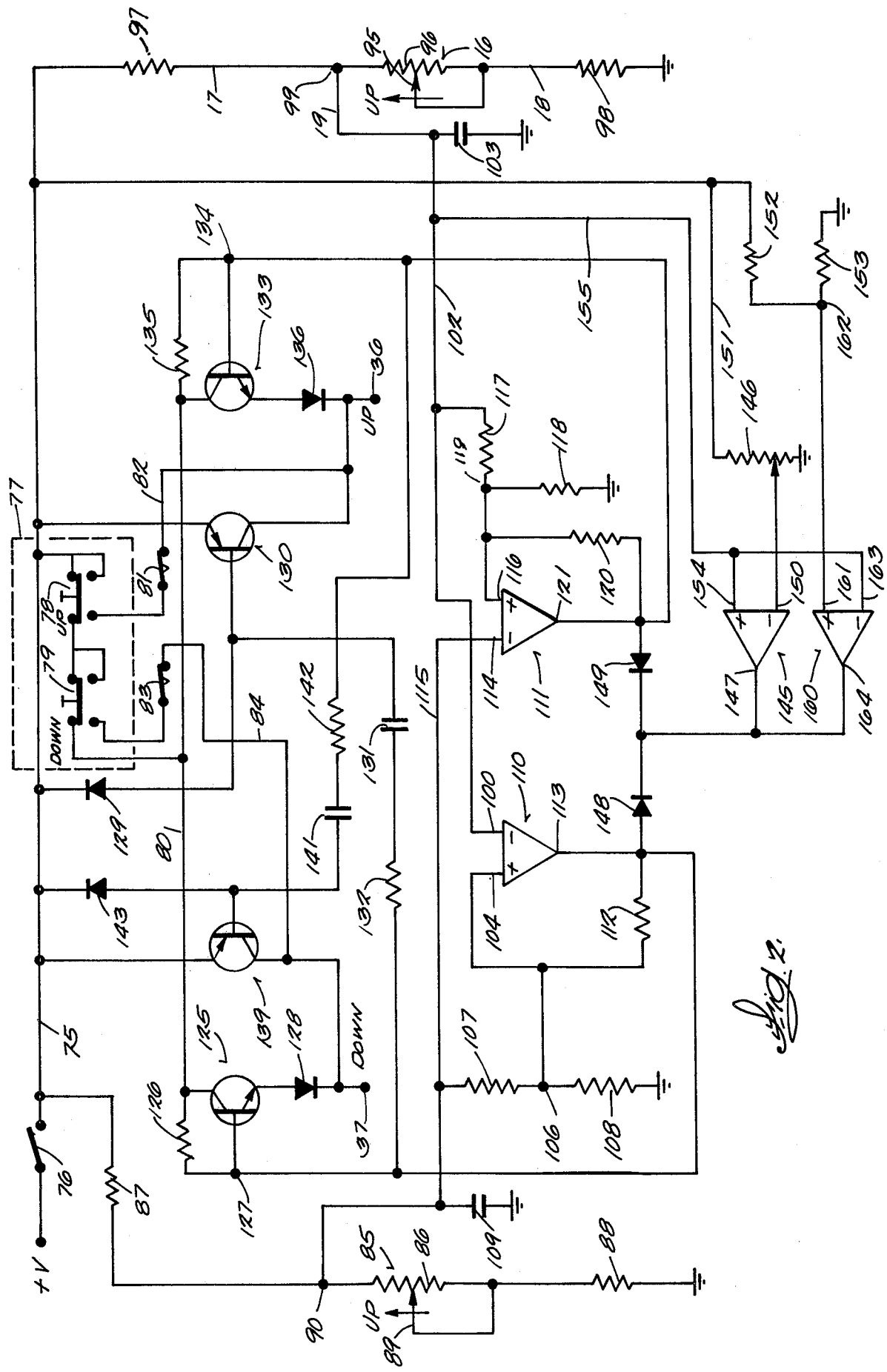
FIG. 2 shows the circuitry for controlling the hydraulic pump motor together with the manual controls which are used for selecting trim and tilt angles.

In the illustrated example, motor 31 in FIG. 1 is a series type motor having one field coil 32 which, when energized, causes the motor to rotate in one direction and another field coil 33 which, when energized, causes the motor to rotate in the opposite direction. The motor circuit is supplied through a fuse 34 which connects to a power source terminal (+V), such as a storage battery, not shown. The motor control unit circuitry, generally designated by the numeral 35 in FIG. 1, upon receiving appropriate signals to either the up signal input terminal 36 or the down signal input terminal 37, effects a circuit through the motor 31 from the power supply line 38 to a ground terminal 39. The stern leg tilt and trim control circuitry of FIG. 2 provides the control signals to the up and down terminals 36 and 37 of FIG. 1 which result in the motor 31 operating in a corresponding direction for raising and lowering the stern leg 3 under hydraulic pressure influence. Production of these signals will be discussed in detail later. First, however, the circuitry of the motor control unit will be described in greater detail.

The motor control 35 circuitry in FIG. 1 is symmetrical and comprised of two major conductive paths one of which is rendered conductive to cause the motor 31 to operate in a direction that results in the stern leg being lowered and the other of which causes the motor to operate oppositely for raising the stern leg. Consider the path of the circuit that is active when the stern leg lowering operation is in effect. This path comprises a pair of power transistors 45 and 46 and a switching transistor 47 which is operative to turn transistors 45 and 46 on and off. The emitter of transistor 45 is connected through a resistor 48 to a motor terminal 49. The collector of transistor 45 is connected by means of lines 50 and 51 to ground point 39 through a current limiting resistor 40. Motor terminal 49 always has voltage applied to it since it is connected through motor field coil 32 and the armature of motor 31 to power line 38 which is, in turn, supplied from the positive terminal (+V) of the battery. A biasing resistor 52 is connected between the emitter and base of transistor 45. No current flows through biasing resistor 52 unless switching transistor 47 is turned on. When transistor 47 turns on in response to receiving a lift down or trim down signal on terminal 37, a path through the armature of motor 31 and its field coil 32 to ground is completed by way of the emitter to collector terminals of transistor 45. In other words, when switching transistor 47 turns on a voltage drop is produced across baising resistor 52 and forward biasing and turn on of power transistor 45 occurs.

Power transistor 46 which is in parallel with transistor 45 is connected similarly to transistor 45. Thus, transistor 46 has its emitter connected to motor terminal 49 through a resistor 53. A biasing resistor 54 is also connected between the emitter and base of transistor 46. It will be evident that when switching transistor 47 turns on, transistor 46 will turn on along with transistor 45 for them to jointly handle the relatively high motor current. Of course, one or the other of the transistors 45 or 46 could be eliminated if a single transistor of sufficient current-carrying capacity is available. When the input signal to down terminal 37 is discontinued, switching transistor 47 turns off and, of course, so do power transistors 45 and 46. The high reverse voltage that would otherwise be induced across the motor terminals when current through it is interrupted and its magnetic field collapses is prevented by a normally reverse biased diode 172 which is effectively connected across the motor terminal.

Switching transistor 47 has its base connected through a resistor 55 to terminal 37 on which the signal for causing the stern leg to swing down is applied. When terminal 37 goes high from a zero voltage state, biasing current is conducted through the base to emitter circuit of switching transistor 47 and through a resistor 56 to ground. This turns on transistor 47 and effectively causes a point 57 leading from its collector to go towards ground voltage level. The resulting current flow through power transistor biasing resistors 52 and 54 produces the voltage drops which forward bias the two transistors and turn them on. Switching transistor 47 only has to handle the signal level current delivered to down terminal 37.

The other path of the motor control unit 35 circuitry involved in the trimming or tilting the stern leg up is structurally and functionally similar to the down circuit which was just described. The up circuit is comprised of a switching transistor 60 whose emitter is connected to ground through resistor 56. The base of transistor 60 is connected through a resistor 61 to the up signal input terminal 36 of the control unit. It will be evident that if there is a signal to terminal 36 for causing the motor 31 to turn in a direction which raises stern leg 3, transistor 60 will turn on and a point 62 leading to its collector will assume nearly ground potential. Power transistors 63 and 64 provide the parallel current paths for allowing current flow through the armature and field coil 33 of motor 31. The biasing resistors for transistors 63 and 64 are marked 65 and 66, respectively. The resistors 67 and 68 through which the transistors 63 and 64 are connected to the other motor terminal 69 all perform the same function as previously explained in reference to the down leg of the motor control unit circuitry. Another diode 70 is provided to limit the voltage due to self inductance across the motor armature and its field coil 33 when transistors 64 and 64 suddenly turn off.

Refer now to FIG. 2 which depicts the trim and tlt control unit and shows the operator controls and the associated circuitry for generating the signals that are input to up and down terminals 36 and 37 of the motor control unit in FIG. 2 and cause the pump driving motor 31 to turn the hydraulic pump 26 in one direction or another. The up and down input signal terminals 36 and 37 are repeated in FIG. 2 since they constitute the same terminals in both figures.

The trim and tilt control unit circuitry in FIG. 2 has an electric power input terminal marked +V which is understood to connected a dc power source such as a storage battery, not shown. The power bus 75 for the control circuitry is connected to the source through a switch 76.

How tilt is effectuated independently and exclusively of the trim control function will be considered first. Tilting of the stern leg 3 is accomplished with a push button switch station that is designated by the dashed line rectangle marked 77. The station contains a push button switch 78 which is depressed when the operator desires to lift the stern leg 3 in the tilt mode. Another push button 79 is provided and is used when the operator desires to lower stern leg 3 in the tilt mode. Note that when push buttons 78 and 79 are in their unactuated states as shown in FIG. 2, a series circuit is formed through the pushbuttons between power bus 75 and a trim circuit voltage supply line 80. When either tilt pushbutton switch 78 or 79 is actuated by depressing it manually, trim control power line 80 is deenergized and the trim control is disabled because the series circuit through the push button switches is then interrupted.

Tilting the stern leg 3 up is accomplished by depressing push button switch 78. This completes a circuit from power bus 75 through an up limit switch 81 and a line 82 which connects to up signal terminal 36. As previously explained, this turns on switching transistor 60 in FIG. 1 and results in the motor 31 turning in an appropriate direction for causing the hydraulic system to lift the stern leg. As soon as the operator relieves pressure from pushbutton 78, it restores to its unactuated state as shown and permits the power line to be reconnected to the trim control circuit supply line 80.

Similarly, when down pushbutton switch 79 is depressed for causing the stern leg to tilt down, an open circuit is created between power bus 75 and trim control power supply line 80 to thereby disconnect power supply line 80 from power bus 75 to disable the trim control again. When pushbutton switch 79 is depressed, circuit continuity through the other pushbutton switch 78 is maintained in which case power is supplied from bus 75 through the normally open contacts of pushbutton switch 79 through a down limit switch 83 and a line 84 which leads to down signal terminal 37 in the motor control unit. The actuators for the limit switches 81 and 83 are not shown but it will be understood that limit switch 81 opens when the stern leg reaches its maximum permissible upper position under tilt switch control and limit switch 83 opens under the influence of stern leg 3 reaching its lowermost permissible limit. Limit switch 83 is not indispensable since by the time the stern leg has tilted down to within the trim angle range, the trim control can take over as will be more evident in the ensuing discussion.

Referring to FIG. 2, when the tilt pushbutton switch 79 has been used long enough to get the stern leg back into the trim angle range, the trim angle which the operator has or will set is determined by the operator using a manually settable potentiometer which is generally designated by the numeral 85 in FIG. 2 and appears at the left side of this figure. The resistor portion 86 of potentiometer 85 is in a voltage divider circuit which is connected between power supply line 75 and ground and includes resistors 87, 86 and 88. Potentiometer 85 has a wiper 89 that is movable under the manual influence of the operator to select any trim angle within the predetermined trim angle range. The wiper may move along a scale, not shown, which is calibrated to indicate stern leg trim angle. Any suitable potentiometer could be used for selecting trim angle. One in which the slider is turned by a thum wheel, not shown, is suitable. An electromechanical potentiometer which displays numerical values for the trim angle setting could also be used. Insofar as the circuitry is concerned, the purpose of the potentiometer is to adjust the potential at the point marked 90 in the voltage divider circuit. When the slider 89 is moved downwardly in FIG. 2, the voltage at point 90 goes more positive and when the slider 89 is moved upwardly, the voltage at point 90 goes more negative. Operator selectable potentiometer 85 can be considered to be a reference signal producing potientiometer.

The potentiometer 16 which is mounted on the stern leg as previously described provides a feedback signal indicative of the present angular position of the stern leg 3. The potentiometer is depicted at the right side of the FIG. 2 diagram. Potentiometer 16 has a wiper 95 which moves on the resistor portion 96 of the potentiometer as the stern leg turns during the tilt and trim operation. The resistor portion is in a voltage divider circuit consisting of a resistor 97 serially connected with potentiometer resistor 96 and another resistor 98 between power bus 75 and ground. When potentiometer wiper 95 is moved down in FIG. 2 as a result of stern leg rotation, the voltage at its output point or terminal 99 goes more positive and, when the wiper is moved up, the voltage at point 99 goes more negative in this illustrative embodiment.

When the boat operator desires to set the stern leg 3 at a particular trim angle, the wiper 89 in the reference voltage or trim setting potentiometer 85 is moved manually to a position where it indicates the desired trim angle setting. This will cause a voltage change at point 90 on potentiometer 85. Upon this event, there will be a difference between the voltage at point 90 on the trim setting potentiometer and the voltage at point 99 of the feedback or present stern angle sensing potentiometer 16. In the circuit of FIG. 2, the voltage at point 90 of the trim setting potentiometer 85 is compared with the voltage at point 99 of the feedback potentiometer 16. When a difference between the two voltages exists, hydraulic pump drive motor 31 is caused to operate and drive the stern leg until it angulates to a position which equlizes or nulls the difference between the voltages at points 90 and 99.

Two integrated circuit comparators 110 and 111 make the comparisons for the stern leg 3 up and down operations. Consider the first comparator 110 which is active when the operator commands the stern leg to trim down by adjusting wiper 89 of potentiometer 86. Its inverting input 100 is connected by means of a line 102 to point 99 of feedback potentiometer 16. There is a capacitor 103 connected between line 102 and ground to filter out transients and interference signals which might be propogated to the trim control circuitry by the engine ignition system, for example. The noninverting input 104 of comparator 110 is indirectly connected to point 90 on the trim setting or reference potentiometer 85. As shown, noninverting input 104 of comparator 110 connects to the midpoint 106 of a voltage divider comprised of resistors 107 and 108. Resistors 107 and 108 are chosen to provide a voltage at point 106 for biasing and for compensating the offset voltage of comparator 110. Another interference rejecting capacitor 109 is used in this circuit. There is a feedback circuit including a resistor 112 connected between output 113 of comparator 110 and its noninverting input 104. The feedback circuit produces hysteresis, that is, it establishes the upper and lower comparator trip levels or voltage differential which must exist between the inputs 100 and 104 of the comparator before the comparator output will change states. With hysteresis, no trivial difference between the voltages at point 90 and 99 will cause the output of the comparator to change state undesirably. Moreover, hysteresis prevents hunting if the stern leg should overtravel a little or if its angle should change a little as a result of the propeller striking an object in the water. It is to be noted that whenever the difference between the voltages at points 90 and 99 is null or substantially zero, the output 113 or comparator 110 is in its low state in which case this output sinks current.

The comparator circuits are mirror images of each other. Comparator 121 is involved in causing the stern leg to be driven up in its trim range. Thus, the noninverting input 114 of the other comparator 111 is connected by means of a line 115 to point 90 on the reference or trim setting potentiometer 85. The noninverting input 116 of comparator 111 is connected to point 99 on the feedback potentiometer 16. There is a voltage divider consisting of series connected resistors 117 and 118 which provides a biasing and offset voltage compensating voltage at the intermediate point 119 of the divider. There is also a feedback and hysteresis providing resistor input 116 of comparator 111. The output 121 of the comparator is also in a low state for sinking current when the voltage difference between points 90 and 99 is nulled.

A transistor 125 is involved in turning hydraulic pump drive motor 31 on for rotation in the proper direction for causing stern leg 3 to trim down when the trim potentiometer has been set to cause a voltage differential of one polarity between points 90 and 99. The collector of transistor 125 is connected to the trim control unit circuitry supply line 80. As explained earlier, this line is only energized if both of the tilt control pushbutton switches are not in use and are in their normally unactuated state as shown. There is a resistor 126 connected between the collector and base of transistor 125. When there is no voltage differential between points 90 and 99 and the output 113 of comparator 110 is in its low impedance state and sinking current, point 127, corresponding to the base of transistor 125, is low or essentially at ground potential. This prevents base-emitter biasing current from flowing through transistor 125 and keeps it turned off. When there is a differential between points 90 and 99, output 113 of comparator 110, with some degree of hysteresis, switches to its high impedence state, thereby essentially isolating the base point 127 of transistor 125 from ground. Upon this event, the current which has been following through resistor 126 diverts through the base-emitter circuit of transistor 125, turning it on. Current then flows from supply line 80 through transistor 125 and a diode 128 to the down signal input terminal 37 of the motor control unit. This signal current turns on transistor 47 in FIG. 1 and causes the motor to turn in a direction that brings the stern leg 3 down as described earlier. When the stern leg is driven through the angle at which the voltage differential between points 90 and 99 is nulled, output 113 of comparator 110 switches to its low impedance state again for sinking current and thereby turning transistor 125 and hydraulic pump motor 31 off.

Means are provided for plugging motor 31, that is, applying a short pulse of reverse current to it to brake it and prevent it from any significant coasting after null is reached. The plugging means for the stern leg down trimming operation comprises a transistor 130, a capacitor 131 and a resistor 132. When null is reached and the output 113 of comparator 110 switches to its low impedence or current sinking state, capicitor 131 charges from power bus 75 through the emitter-base circuit of transistor 130 and resistor 132. In one actual embodiment, the RC time constant for resistor 131 and capacitor 132 is about 22 ms. Upon occurrence of this short charging pulse, transistor 130 turns on momentarily and conducts current from power bus 75 through its emitter-collector circuit to up signal terminal 36. This turns on transistor 60 momentarily in the motor control unit of FIG. 1 and causes current to flow through motor 31 in a direction opposite to the direction in which it was flowing while the stern leg was being driven down. This reverse current flow, of course, stops the motor 31. The pulse is terminated when capacitor 131 becomes fully charged. A diode 129 allows the charge on capacitor 131 to equalize when down transistor 125 is turned on next.

When the operator adjusts trim setting potentiometer 85 for causing the stern leg 3 to be driven up within the trim range, comparator 111 becomes involves. Moving potentiometer wiper 89 in a direction to cause the stern leg to be trimmed in the upward direction causes the voltage at point 90 to go more negative. Thus, point 90 is more negative than point 99 on the feedback potentiometer. Hence, the voltage differential between the inputs 114 and 116 of trim up control comparator 111 causes the output 121 to switch to its high state. The effect produced is comparable to what has been described in connection with the down control. In this case, however, a transistor 133 supplies the signal to up terminal 36 of the motor control unit. When the output 121 of comparator 111 goes high from its former current sinking state, a point 134 leading to the base of transistor 133 goes high or essentially becomes isolated from ground. This permits biasing current to flow from trim unit power line 80 through a resistor 135 and through the base-emitter circuit of transistor 133 and through a diode 136 to the up signal terminal 36 of the motor control unit. What then happens in the motor control unit circuit of FIG. 1 has been previously explained. When the stern leg 3 is driven to the angular position that corresponds to the setting of the wiper 89 in potentiometer 85, the wiper 95 of feedback potentiometer 16 also adjusts under the influence of the stern drive until the voltage at point 99 agrees with that at point 90. The output 121 of comparator 111 then switches to its low or current sinking state and transistor 133 turns off, thereby deenergizing motor 31.

Means are also provided for plugging or braking the motor when null is reached after the motor has been driving the stern leg 3 in the trim up direction. Transistor 139 is involved in this operation. Its emitter-base path is in a series circuit with a timing capacitor 141 and a resistor 142 and this series circuit is connected between main power bus 75 and the output 121 of comparator 111. As in the previously discussed case, when null is reached and output 121 begins to sink current again, a pulse of current flows through the base-emitter of transistor 139 to charge capacitor 142. This turns transistor 139 on momentarily for it to deliver a pulse of current through its emitter-collector path to the down terminal 37 of the motor control circuit. The result is that the motor 31 is stopped with no significant coasting. A diode 143 is provided for enabling the charge on capacitor 141 to equalize when transistor 133 turns on next.

Means are provided for disabling or locking out the manually controllable trim functions if the stern leg is tilted beyond a predetermined angle in the up direction. Another comparator 145 is involved in the lock-out function. First of all recall that tilt is under the control of pushbuttons 78 and 79. When pushbutton 78 is depressed, for example, to tilt the stern leg up, supply line 80 becomes deenergized and the circuit will not respond to a trim adjustment. Thus, the pushbutton tilt control switches 79 and 80 assume exclusive control of the tilt-trim function when either of them is depressed. A feature of the invention is to not only disable the trim function when tilt is in progress but to also prevent restoration of the trim function until after the stern leg is tilted back to within the acceptable range for trimming. A so-called upper limit setting potentiometer 146 is provided and settable to determine if the stern leg 3 is raised too high to justify allowing the trim mode to be reestablished although tilt has been discontinued by reason of pushbutton 78 having been released. Assume, for example, that the stern leg is raised with the tilt control out of the trim range and that both push buttons 78 and 79 are in normally closed position again as shown. In the absence of the lock-out feature, this would again allow the trim control circuit to be activated. Under such circumstances, one or the other of the outputs 113 or 121 of comparators 110 and 111, respectively, could be made to go high and turn on either transistor 125 or 133 to supply a down or up signal to the motor control unit. However, when tilt in the up direction exceeds the allowable upper trim limit as determined by the setting of potentiometer 146, comparator 145 is operative to sink current into its output 147. This output is connected between the cathodes of a pair of diodes 148 and 149 which, under the circumstances, would become forward biased so as to prevent either down driving transistor 125 or up driving transistor 133 from receiving base current. Thus, the motor 31 cannot turn on and the trim function becomes deactivated. The noninverting input 150 of comparator 145 is connected to the wiper of potentiometer 146. This potentiometer is connected by way of a line 151 to the top of a voltage divider comprised of resistors 152 and 153. The top of resistor 152 is connected to the dc supply bus 75 and the bottom of resistor 153 is connected to ground such that a selectable voltage can be obtained from potentiometer 146 for application to the inverting input 150 of comparator 145. The noninverting input 154 of comparator 145 is connected by way of line 155 to point 99 on the feedback potentiometer 16 to obtain the voltage with which the voltage on the wiper of potentiometer 146 is compared. If the up tilt switch 78 is used to raise the stern leg so the feedback potentiometer voltage at point 99 becomes less positive than the setting of the voltage derived from up limit potentiometer 146, comparator 145 trips and becomes a sink at its output terminal 147 as previously mentioned. The disabled trim function will not be reinstated until the feedback potentiometer 16 is returned to within the trim range by using the down tilt pushbutton 79.

Important features of the invention are that the trim control is adapted to remember its setting previous to tilt being executed and to restore the stern leg to the position in which it was previously trimmed. This results from the fact that when the stern leg is tilted down sufficiently to be in the predetermined permissible trim range, point 99 of feedback potentiometer 16 goes more positive again in which case the differential voltage between inputs 154 and 150 of comparator 145 has such polarity as to cause the comparator to trip and restore its output 147 to its high impedance state so it will no longer sink current. This puts the trim function under the control of the other comparators 110 and 111 again. Then, unless the trim potentiometer 85 had been previously at the upper trim limit before the tilt up operation was performed, there will be a difference in the voltages at points 90 and 99. This will cause the motor to run until it rotates the stern leg to a position where the voltage difference between points 90 and 99 is nulled and this corresponds to the setting of trim setting potentiometer 85 before stern leg control was taken over by the tilt control switch 78.

A safety lock-out that functions if a fault, such as an open circuit, occurs in some part of the control circuitry is exemplified by the use of another comparator 160. The reference voltage applied to the noninverting input 161 of this comparator is derived from an intermediate point 162 in the voltage divider consisting of resistors 152 and 153. In other words, an adequately stable reference voltage is always applied to noninverting input 161. The inverting input 163 of comparator 160 is connected by way of line 155 to point 99 on feedback potentiometer 16. If, by way of example, the wires from the feedback potentiometer 16, which is on the stern leg and operated therewith, become disconnected, input 163 of comparator 160 will become more positive than input 161, thereby causing the output 164 of comparator 160 to switch from a normally high state to a low impedance state for sinking current. Sinking through either of the diodes 148 or 149 will again prevent base current being supplied to either pump motor control transistor 125 or 133 in which case no drive signals can be delivered to the up or down terminals 36 or 37 and the motor cannot run until the fault is corrected. However, with the particular type of failure just described, one or the other of the tilt pushbutton switches 78 or 79 can be used to activate the tilt motor 31 directly.

The trim and tilt control circuitry requires very little space to accommodate it. In one actual embodiment, a quad comparator chip contains all of the comparators 110, 111, 145 and 160. By way of example and not limitation, a type CA339G or an LM339 quad comparator can be used. This type of comparator requires only a single polarity dc power supply which is advantageous for electronic systems deriving their power from a battery on a boat. Moreover, these comparators lend themselves to providing hysteresis between their upper and lower trip levels with appropriate selected feedback resistors such as those marked 112 and 120 so that hunting of the motor or self-correcting action is avoided if the stern leg receives a minor shock that deflects it out of its set angle by a small amount within the hysteresis range.

It should be noted that the control circuit need not be built using semiconductor components exclusively. For example, transistors 47 and 60 in the motor control circuit of FIG. 1 could be replaced by relay coils operating suitable contacts to switch the motor 31. Further, relays, not shown, to control a permanent magnet motor as in U.S. Pat. No. 3,662,243, or relay contacts in place of transistor 45, 46 and 63, 64 to control a series motor could be used.

In summary, a unit has been described wherein the trim controls have an operating range limited to the trim range, tilt cannot be performed using the trim controls, tilt switches override the trim control, and the trim control is inactivated if the tilt angle exceeds a predetermined upper limit where this is determined by the setting of an upper limit potentiometer. In addition, it has been shown how the trim control will be deactivated and stern leg angle control left to the tilt control if the wires which are most vulnerable to breakage, that is, those that connect to the feedback potentiometer and are repeatedly flexed by stern leg movements, should break. Further features that have been described are that the trim setting is remembered and automatically restored after the tilt mode has been used. Although the manner in which various new features of the control have been implemented has been described in detail, such description is intended to be illustrative rather than limiting, for the features may be variously embodied and the scope of the invention is to be limited only by interpretation of the claims which follow.

We claim:

1. Apparatus for controlling angulation, about a nominally horizontal axis, of a stern leg having a propeller and mounted outboard of a water craft for angulating between substantially vertical and a first angular limit defined as the trim range and a second angular limit defined as the tilt range, which apparatus comprises reversible electric motor means and means operatively coupling said motor means to said stern leg for said stern leg to be driven up through an increasing angle from vertical when said motor runs in one direction and down through a decreasing angle when said motor runs in the opposite direction, motor control circuit means connected with said motor means and responsive to being provided with first and second control signals by energizing said motor means from an electric power source to run in the one or the opposite direction, respectively, a trim angle control circuit having electric power input means, said circuit including manually settable means for producing a reference signal corresponding to the stern leg trim angle desired and position signal generating means for producing a signal corresponding to the present angle of the stern leg and varying with changes in said angle, comparator means for compariing the reference signal with the position signal and means responsive to said comparator means determining that said position signal corresponds to a stern leg angle less than the desired trim angle by providing said first control signal to thereby cause said motor means to run in said one direction for driving said stern leg up until the difference between the desired and present trim angle is nulled, and said means being responsive to said comparator means determining that said position signal corresponds to a stern leg angle greater than the desired trim angle by providing said second control signal to thereby cause said motor means to run in said opposite direction for driving said stern leg down until the difference between the desired and present trim angle is nulled, and tilt control switch means comprising one and another switch each of which is manually actuable from one state to another for commanding said stern leg to tilt up and down, respectively, said switches being in a circuit wherein when they are both in one state they connect said power source to said power input means of said trim angle control circuit for energizing it to enable the trim function, and when either is actuated to its other state it will disconnect said power input means to disable and override the trim function and provide one or other of said first and second control signals to said motor control circuit for causing said stern leg to tilt up or down, respectively.

2. Apparatus in accordance with claim 1 including means responsive to a signal from said position signal generating means corresponding to said stern leg being tilted up by actuation of said tilt control switch means beyond said trim range by deactivating said trim angle control circuit and responsive to a signal from said position signal generating means corresponding to said stern leg being tilted down again under the control of said another manually actuable tilt switch by reactivating said trim angle control circuit when actuation of said tilt switch is discontinued.

3. Apparatus in accordance with claim 2 including a trim angle memory characteristic wherein when actuation of said tilt switch is discontinued and the stern leg is within the trim range said manually settable means produces a reference signal corresponding to the desired stern leg trim angle at which it was set previous to tilting and said position sensing means produces a position signal corresponding to the tilt of the stern leg within the trim range to cause said stern leg to be driven until it reaches the trim angle previously set.

4. Apparatus for controlling angulation, about a nominally horizontal axis, of a stern leg having a propeller and mounted outboard of a water craft for angulation between substantially vertical and a first angular limit defined as the trim range and a second angular limit defined as the tilt range, which apparatus comprises reversible electric motor means and means operatively coupling said motor means to said stern leg for said stern to be driven up through an increasing angle from vertical when said motor runs in one direction and down through a decreasing angle when said motor runs in the opposite direction, motor control circuit means connected to said motor means and responsive to being provided with first and second control signals by energizing said motor means from an electric power source to run in the one or the opposite direction, respectively, a trim angle control circuit having electric power input means and a manually settable means for producing a reference signal corresponding to the stern leg trim angle desired and position signal generating means for producing a signal corresponding to the present angle of the stern leg and varying with changes in said angle, first and second comparators each having input means for said reference and position signals and each having output means, the output means of each comparator having the same predetermined logical state when there is no substantial difference between the reference and position signals on their inputs, one of said comparator outputs switching to a different logical state when said reference signal is greater than the position signal and the other switching to a different logical state when said reference signal is smaller than said position signal, first and second semiconductor switch means each having a control element coupled to the output means of the comparators, said switch means also being connected to said electric power input means of said trim angle control circuit means, the first of said switch means being turned on in response to the first comparator output means changing from said predetermined to said different output state to thereby provide said one control signal to said motor means control circuit for said motor to run in said one direction to trim said stern leg and the second of said switch means being turned on alternately in response to the second comparator output means changing to said other logical state to thereby provide the other control signal for said motor to run in the opposite direction, to trim said stern leg by running of said motor being terminated when the difference between said reference and position signals is nulled, and feedback resistor means connected, respectively, between the output means and the input means of each comparator to provide hysteresis and establish the magnitude of the difference that must exist between said reference signal and position signal before said comparators will change their output state.

5. Apparatus in accordance with claim 4 including tilt control switch means comprising one and another switch each of which is manually actuable from one state to another for commanding said stern leg to tilt up and down, respectively, said switches being in a circuit wherein, when they are both in one state, they connect said power source to said power input means of the trim angle control circuit for energizing it to enable the trim function, and, when either is actuated to its other state, it will disconnect said power input means to disable and override the trim function and produce one or the other of said first and second control signals to said motor control circuit for causing said stern leg to tilt up or down, respectively.

6. Apparatus in accordance with claim 4 including means for limiting coasting of said motor after it is deenergized, comprising first and second transistors each having a base, an emitter and a collector, the emitters being connected to a power source, a capacitor and a resistor connected in a series circuit between the base of the second transistor and the output of the first comparator and a capacitor and a resistor connected in a series circuit between the base of the first transistor and the output of the second comparator, the predetermined state of the comparator outputs being a logical low state and the other output state of the comparators being a logical high state, the capacitor in series with the second transistor charging when the output of said first comparator changes back from a high state to a low state concurrently with termination of a first control signal that has caused said motor to run in one direction to thereby turn on said second transistor momentarily for it to provide a second control signal pulse from its collector to energize said motor for running in the opposite direction for the duration of the pulse, the capactior in series with the first transistor charging when the output of the second comparator changes back from a high state to a low state concurrently with termination of a second control signal that has caused the motor to run in said opposite direction to thereby turn on said first transistor momentarily for it to provide a first control signal pulse from its collector to energize said motor for running in said one direction for the duration of the pulse.

7. The apparatus in accordance with any of claims 4, 5 or 6 including means for deactivating said trim angle control circuit when said stern leg is tilted up above the acceptable trim range, comprising a third comparator having input and output means, the output means being coupled to the outputs of said first and second comparators, means for coupling the signal corresponding to the present position of said stern leg to one input of said third comparator and means for coupling a reference voltage signal to the other input of said third comparator, which reference voltage corresponds to the upper limit of the stern leg below which enabling the trim function is permitted, said comparator responding to a difference between said reference and position signals resulting from the stern leg being out of the trim range by causing its output to assume a state which prevents both semiconductor switch means from providing a control signal to said motor control circuit.

8. The apparatus in accordance with claim 7 including means for disabling the stern leg trim function if the stern leg position signal is lost to one or both of said first and second comparator means, comprising a fourth comparator having noninverting and inverting input means and output means, the output means being coupled to the ouputs of said first and second comparators, means for coupling the voltage signal corresponding to the present position of said stern leg to said noninverting input of said comparator means and means for coupling a fixed reference voltage to said inverting input, said output of the fourth comparator remaining in a state which prevents both semiconductor switch means from providing a control signal to said motor control circuit as long as the position signal voltage is greater in magnitude than the reference voltage, said fourth comparator responding to said reference voltage signal becoming higher due to loss of said position voltage by causing its output to assume a state which prevents both semiconductor switch means from providing a control signal to said motor control circuit.

* * * * *